(12) United States Patent
Lin et al.

(10) Patent No.: US 9,148,387 B2
(45) Date of Patent: Sep. 29, 2015

(54) HARDWARE HASH TABLE VIRTUALIZATION IN MULTI-PACKET PROCESSOR NETWORKING SYSTEMS

(71) Applicant: BROCADE COMMUNICATIONS SYSTEMS, INC., San Jose, CA (US)

(72) Inventors: Kwun-Nan Kevin Lin, Saratoga, CA (US); Piya Chindaphorn, San Jose, CA (US); Arijit Bhattacharyya, San Jose, CA (US); Ramesh Gowthaman, San Jose, CA (US); Vishal Sinha, Union City, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 28 days.

(21) Appl. No.: 14/207,146

(22) Filed: Mar. 12, 2014

(65) Prior Publication Data

US 2014/0334494 A1     Nov. 13, 2014

Related U.S. Application Data

(60) Provisional application No. 61/822,216, filed on May 10, 2013.

(51) Int. Cl.
| | | |
|---|---|---|
| *H04L 12/701* | (2013.01) | |
| *H04L 12/801* | (2013.01) | |
| *H04L 29/06* | (2006.01) | |
| *H04L 12/935* | (2013.01) | |
| *H04L 12/931* | (2013.01) | |

(52) U.S. Cl.
CPC ............ *H04L 49/3009* (2013.01); *H04L 49/70* (2013.01)

(58) Field of Classification Search
CPC ..... H04L 45/00; H04L 47/10; H04L 29/0653; H04L 29/06
USPC ........................................ 370/389, 392, 400
See application file for complete search history.

(56) References Cited

U.S. PATENT DOCUMENTS

| | | |
|---|---|---|
| 5,481,073 A | 1/1996 | Singer et al. |
| 5,651,003 A | 7/1997 | Pearce et al. |
| 6,373,840 B1 | 4/2002 | Chen |
| 6,490,276 B1 | 12/2002 | Salett et al. |
| 6,496,502 B1 | 12/2002 | Fite, Jr. et al. |

(Continued)

FOREIGN PATENT DOCUMENTS

WO     2015026950 A1     2/2015

OTHER PUBLICATIONS

Office Action Dated Jul. 16, 2015; U.S. Appl. No. 14/094,931; (41 pgs.).

(Continued)

*Primary Examiner* — Ronald B Abelson
(74) *Attorney, Agent, or Firm* — Fountainhead Law Group P.C.

(57) ABSTRACT

Techniques for virtualizing hardware hash tables in a networking system are provided. In one embodiment, the networking system can maintain a plurality of virtual hash tables corresponding to a plurality of hardware hash tables in the networking system. For each hardware hash table and its corresponding virtual hash table, the networking system can intercept operations directed to the hardware hash table and apply the intercepted operations to the virtual hash table. The networking system can then selectively install and/or uninstall virtual hash table entries to/from the hardware hash table in view of the operations.

20 Claims, 7 Drawing Sheets

(56) References Cited

U.S. PATENT DOCUMENTS

| | | | |
|---|---|---|---|
| 6,516,345 | B1 | 2/2003 | Kracht |
| 6,526,345 | B2 | 2/2003 | Ryoo |
| 6,597,658 | B1 | 7/2003 | Simmons |
| 6,765,877 | B1 | 7/2004 | Foschiano et al. |
| 6,839,342 | B1 | 1/2005 | Parham et al. |
| 6,839,349 | B2 | 1/2005 | Ambe et al. |
| 7,099,315 | B2 | 8/2006 | Ambe et al. |
| 7,106,736 | B2 | 9/2006 | Kalkunte |
| 7,136,289 | B2 | 11/2006 | Vasavda et al. |
| 7,184,441 | B1 | 2/2007 | Kadambi et al. |
| 7,206,283 | B2 | 4/2007 | Chang et al. |
| 7,274,694 | B1 | 9/2007 | Cheng et al. |
| 7,336,622 | B1 | 2/2008 | Fallis et al. |
| 7,426,179 | B1 | 9/2008 | Harshavardhana et al. |
| 7,480,258 | B1 | 1/2009 | Shuen et al. |
| 7,496,096 | B1 | 2/2009 | Dong et al. |
| 7,523,227 | B1 | 4/2009 | Yager et al. |
| 7,697,419 | B1 | 4/2010 | Donthi |
| 8,209,457 | B2 | 6/2012 | Engel et al. |
| 2001/0042062 | A1 | 11/2001 | Tenev et al. |
| 2002/0046271 | A1 | 4/2002 | Huang |
| 2003/0005149 | A1 | 1/2003 | Haas et al. |
| 2005/0063354 | A1 | 3/2005 | Garnett et al. |
| 2005/0271044 | A1 | 12/2005 | Hsu et al. |
| 2006/0013212 | A1 | 1/2006 | Singh et al. |
| 2006/0023640 | A1 | 2/2006 | Chang et al. |
| 2006/0072571 | A1 | 4/2006 | Navada et al. |
| 2006/0077910 | A1 | 4/2006 | Lundin et al. |
| 2006/0092853 | A1 | 5/2006 | Santoso et al. |
| 2006/0187900 | A1 | 8/2006 | Akbar |
| 2006/0253557 | A1 | 11/2006 | Talayco et al. |
| 2007/0081463 | A1 | 4/2007 | Bohra et al. |
| 2008/0137530 | A1 | 6/2008 | Fallis et al. |
| 2008/0281947 | A1 | 11/2008 | Kumar |
| 2009/0125617 | A1 | 5/2009 | Klessig et al. |
| 2009/0135715 | A1 | 5/2009 | Bennah et al. |
| 2010/0172365 | A1 | 7/2010 | Baird et al. |
| 2010/0257283 | A1 | 10/2010 | Agarwal |
| 2010/0284414 | A1 | 11/2010 | Agarwal et al. |
| 2011/0238923 | A1* | 9/2011 | Hooker et al. ............. 711/137 |
| 2013/0215791 | A1 | 8/2013 | Lin et al. |
| 2013/0232193 | A1 | 9/2013 | Ali et al. |
| 2013/0262377 | A1 | 10/2013 | Agarwal |
| 2014/0126354 | A1 | 5/2014 | Hui et al. |
| 2014/0181275 | A1 | 6/2014 | Lin et al. |
| 2014/0269402 | A1 | 9/2014 | Vasseur et al. |
| 2014/0341079 | A1 | 11/2014 | Lin et al. |
| 2014/0341080 | A1 | 11/2014 | Lin et al. |
| 2014/0376361 | A1 | 12/2014 | Hui et al. |

OTHER PUBLICATIONS

Amendment to Carrier Multiple Access with Collision Detection (CSMA/CD Access Method and Physical Layer Specifications—Aggregation of Multi[ple Link Segments; IEEE Std. 802.3ad; 2000; 183 pages.
Appeal Brief Dated Jan. 18, 2013; U.S. Appl. No. 12/463,964 (2120-04200) (23 p.).
Brocade: "Fastlron Ethernet Switch"; Administration Guide; Supporting Fastlron Software Release 08.0.00; Apr. 30, 2013; 400 pages.
Brocade: "Fastlron Ethernet Switch"; IP Multicast Configuration Guide; Supporting Fastlron Software Release 08.0.00; Apr. 30, 2013; 212 pages.
Brocade: "Fastlron Ethernet Switch"; Stacking Configuration Guide; Supporting Fastlron Software Release 08.0.00; Apr. 30, 2013; 170 pages.
Brocade: "Fastlron Ethernet Switch"; Traffic Management Guide; Supporting Fastlron Software Release 08.0.00; Apr. 30, 2013; 76 pages.
Cisco: "Cisco StackWise and StackWise Plus Technology"; technical white paper; C11-377239-01; 10/10; Copyright 2010; 11 pages.
Cisco: "Delivering High Availability in the Wiring Closet with Cisco Catalyst Switches"; technical white paper; C11-340384-01; 01/07; Copyright 1992-2007; 8 pages.
Configure, Verify, and Debug Link Aggregation Control Program (LACP); allied Telesyn; 2004; 10 pages.
Dell: "Stacking Dell PowerConnect 7000 Series Switches"; A Dell Technical White Paper; Jul. 2011; 34 pages.
DLDP Techology White Paper; H3C products and solutions; 2008; 8 pages; http://www.h3c.com/portal/Products_Solutions/Technology/LAN/Technology_White_Paper/200812/623012_57_0.htm.
Examiner's Answer Dated May 7, 2013; U.S. Appl. No. 12/463,964 (2120-4200) (12 p.).
Extreme Networks Technical Brief: "SummitStack Stacking Technology"; 1346_06; 12/10; 8 pages.
Final Office Action Dated Jan. 23, 2012; U.S. Appl. No. 12/463,964 (2120-04200) (11 p.).
Fischer et al.: "A Scalable ATM Switching System Architecture"; IEEE Journal on Selected Areas in Communications, IEEE Service Center, Piscataway, US, vol. 9, No. 8, Oct. 1, 1991; pp. 1299-1307.
International Search Report and Written Opinion for International Appln. No. PCT/US2013/076251 dated May 22, 2014, 11 pages.
Juniper Networks datasheet entitled: "Juniper Networks EX 4200 Ethernet Switches with Virtual Chassis Technology"; Dated Aug. 2013 (2120-04300) (12 p.).
Understanding and Configuring the Undirectional Link Detection Protocol Feature; Cisco support communication; Jul. 9, 2007; Document ID No. 10591; 5 pages; http://www.cisco.com/c/en/us/support/docs/lan-switching/spanning-tree-protocol/10591-77.html.
Link Aggregation According to IEEE Standard 802.3ad; SysKonnect GmbH; 2002; 22 pages.
Link Aggregation; http://en.wikipedia.org/wiki/Link_aggregation; downloaded from Internet on Dec. 16, 2013; 9 pages.
M. Foschiano; Cisco Systems UniDirectional Link Detection (UDLD) Protocol; Memo; Apr. 2008; 13 pages; Cisco Systems.
Migration from Cisco UDLD to industry standard DLDP; technical white paper; Feb. 2012; 12 pages; Hewlett-Packard Development Company.
Office Action dated Mar. 21, 2011; U.S. Appl. No. 12/463,964 (2120-04200) (10 P.).
Partial International Search Report for PCT/US2014/051903 dated Nov. 18, 2014.
Reply Brief Dated Jul. 8, 2013; U.S. Appl. No. 12/463,964 (2120-04200) (14 p.).
Response to Office Action Dated Mar. 21, 2011; U.S. Appl. No. 12/463,964; Response filed Sep. 21, 2011 (2120-04200) (12 p.).
Suckfuell: "Evolution of EWSD During the Eighties"; Institute of Electrical and Electronics Engineers; Global Telecommunications Conference; San Diego; Nov. 28-Dec 1, 1983; [Global Telecommunications Conference], New York, IEEE, US, vol. 2, Nov. 1, 1983; pp. 577-581.
U.S. Appl. No. 14/106,302, filed Dec. 13, 2013, by Lin et al.
U.S. Appl. No. 14/171,152, filed Feb. 3, 2014, by Lin et al.
U.S. Appl. No. 14/094,931, filed Dec. 3, 2013, by Lin et al.
U.S. Appl. No. 14/268,507, filed May 2, 2014, by Agarwal.
U.S. Appl. No. 14/463,419, filed Aug. 19, 2014, by Lee.
U.S. Appl. No. 14/485,343, filed Sep. 12, 2014, by Lin et al.
U.S. Appl. No. 14/506,943, filed Oct. 6, 2014, by Lin et al.
U.S. Appl. No. 14/530,193, filed Oct. 31, 2014, by Ravipati et al.
U.S. Provisional Appl. No. 61/745,396, filed Dec. 21, 201, by Lin et al.
U.S. Provisional Appl. No. 61/799,093, filed Mar. 15, 2013, by Lin et al.
U.S. Provisional Appl. No. 61/822,216, filed May 10, 2013, by Lin et al.
U.S. Provisional Appl. No. 61/825,449, filed May 20, 2013, by Lin et al.
U.S. Provisional Appl. No. 61/825,451, filed May 20, 2013, by Lin et al.
U.S. Provisional Appl. No. 61/868,982, filed Aug. 22, 2013, by Lee.
U.S. Provisional Appl. No. 61/898,295, filed Oct. 31, 2013, by Agarwal.
U.S. Provisional Appl. No. 61/938,805, filed Feb. 12, 2014, by Ravipati et al.
U.S. Provisional Appl. No. 61/971,429, filed Mar. 27, 2014, by Sinha et al.

(56) References Cited

OTHER PUBLICATIONS

U.S. Provisional Appl. No. 61/974,924, filed Apr. 3, 2014, by Lin et al.
International Search Report and Written Opinion for International Appln. No. PCT/US2014/051903 dated Jan. 27, 2015, 16 pages.
Final Office Action Dated Feb. 13, 2015; U.S. Appl. No. 13/850,118; (2120-04201) (14 p.)
Extended European Search Report dated Jul. 30, 2015 for EP Appln. 15000834.0; 8 pages.
Pei et al.: "Putting Routing Tables in Silicon", IEEE Network, IEEE Service Center, New York, NY; vol. 6, No. 1, Jan. 1, 1992; pp. 42-50.
Hsiao et al.: "A High-Throughput and High-Capacity IPv6 Routing Lookup System", Computer Networks, Elsevier Science Publishers B.V., Amsterdam, NL, vol. 57, No. 3, Nov. 16, 2012, pp. 782-794.

* cited by examiner

HARDWARE HASH TABLE VIRTUALIZATION IN MULTI-PACKET PROCESSOR NETWORKING SYSTEMS

CROSS REFERENCES TO RELATED APPLICATIONS

The present application claims the benefit and priority under 35 U.S.C. 119(e) of U.S. Provisional Application No. 61/822,216, filed May 10, 2013, entitled "METHOD FOR MULTIPLYING HARDWARE HASH TABLE SIZE FOR A NETWORKING SYSTEM THAT CONTAINS MULTIPLE PACKET PROCESSORS." The entire contents of this provisional application are incorporated herein by reference for all purposes.

BACKGROUND

Several types of networking systems in use today incorporate multiple packet processors. These systems are referred to herein as "multi-packet processor," or MPP, networking systems. For example, FIG. 1A depicts a stack-based MPP networking system 100 (also known as a "stacking system" or "stack") that comprises a number of stackable devices 102(1)-102(4) interconnected via external links. In this example, stackable device 102(1) is the master device of the system (denoted by the "M" designation). Each stackable device 102(1)-102(4) (which may be, e.g., a Layer 2/3 switch) includes a management CPU (not shown) for managing the operation of that device (note that the management CPU of the master device is considered the "master CPU" and is responsible for managing the stacking system as a whole). In addition, each stackable device 102(1)-102(4) includes a packet processor 104(1)-104(4) for performing wire-speed processing of network traffic flowing through the device. Although four stackable devices are shown in FIG. 1A, stacking system 100 is modular in nature. Thus, stackable devices may be added to, or removed from, stacking system 100 as needed, thereby increasing or decreasing the number of packet processors in system 100.

As another example, FIG. 1B depicts a chassis-based MPP networking system 150 (also known as a "chassis system") that comprises a management module 162 and a number of line cards 152(1)-152(3) interconnected via an internal switch fabric 154. Management module 162 includes a management CPU (not shown) for managing the operation of chassis system 150. In addition, each line card 152(1)-152(3) includes a packet processor 156(1)-156(3) for performing wire-speed processing of network traffic flowing through the line card (via respective data ports 158(1)-158(3)). Like stacking system 100, chassis system 150 is modular in nature. Thus, line cards may added to, or removed from, chassis system 150 as needed, thereby increasing or decreasing the number of packet processors in system 150.

In an MPP networking system such as system 100 or 150, some hardware capacities scale with the number of packet processors. For instance, the total port capacity of chassis system 150 is equal to the number of ports supported by each line card/packet processor, multiplied by the number of line cards/packet processors. If additional line cards/packet processors are added, the total port capacity of the system will increase accordingly.

On the other hand, other hardware capacities of an MPP networking system do not scale with the number of packet processors. For instance, consider hardware MAC tables, which are used for Layer 2 switching and are commonly implemented using a hardware (e.g., DRAM or SRAM-based) hash table within each packet processor. Examples of such hardware hash tables are shown via reference numerals 106(1)-106(4) and 160(1)-160(3) in FIGS. 1A and 1B respectively. In a typical Layer 2 switching flow, when a packet processor of an MPP networking system receives a data packet with a destination MAC address that is "unknown" (i.e., is not in the packet processor's hardware MAC table), the packet processor floods the packet throughout the packet's VLAN. The packet processor also checks whether the packet's source MAC address is unknown and, if so, sends a message to the system's master/management CPU to learn the source MAC address. Upon processing the message, the master/management CPU installs the source MAC address to the hardware MAC table of every packet processor in the system (thereby ensuring that the MAC address is present in hardware when a reply to the original data packet is received). Since this flow requires each hardware MAC table to maintain the same set of learned MAC addresses, adding additional packet processors (and thus, additional hardware MAC tables) will not increase the system's hardware MAC table capacity; instead, that capacity will be limited by the size of the smallest hardware MAC table in the system.

Generally speaking, the need to duplicate learned MAC addresses across hardware MAC tables is not an issue if the hardware MAC tables are the same size—in this case, the applications running on the MPP networking system can be programmed to account for the common size limit shared by all of the hardware MAC tables, and thus can manage the tables in a uniform manner. However, this requirement can cause problems if the hardware MAC tables have varying sizes. For example, in stacking system 100 of FIG. 1A, assume that hardware hash tables 106(1)-106(4) of packet processors 104(1)-104(4) are used as hardware MAC tables. Further assume that hardware hash tables 106(1)-106(3) each support 32K entries, while hardware hash table 106(4) only supports 16K entries. In this scenario, if the CPU of master device 102(1) attempts to install a MAC address entry to every hardware hash table in the system, the installation may succeed with respect to tables 106(1)-106(3) (due to their larger size), but may fail with respect to table 106(4) (due to its smaller size). This inconsistency can be very difficult to manage in software, particularly since the stackable devices of stacking system 100 can be added or removed at will. In addition, if left unhandled, the failed MAC installation at packet processor 104(4) can lead to several negative consequences, ranging from increased flooding (if the uninstalled MAC address is a destination in a data flow) to the inability to learn proper network protocol states (if the uninstalled MAC address is a protocol MAC address).

One workaround for the foregoing problem is to constrain the effective hardware MAC table size of each packet processor in an MPP networking system to the smallest hardware MAC table size. For instance, in the example above, stacking system 100 can be configured to use only 16K entries per table, even though hardware hash tables 106(1)-106(3) actually support 32K entries. While this workaround avoids situations where a MAC address entry cannot be consistently installed to all hardware MAC tables, it clearly does not make optimal use of the hardware table capacity of each packet processor.

Another workaround is to implement an alternative MAC learning approach known as "flow-based MAC learning." With flow-based MAC learning, a data packet with an unknown destination MAC address is trapped to the system's master/management CPU. The master/management CPU then installs the source (or destination) MAC address of the packet, if needed, solely in the hardware MAC table of the ingress packet processor, without duplicating the address to other packet processors in the system. This approach is efficient in terms of hardware table usage since MAC address entries are effectively installed "on demand" at a given packet processor in response to a received traffic flow. Unfortunately, flow-based MAC learning is also very CPU intensive because all packets that fail hardware matching must be processed by the master/management CPU.

The high CPU cost of flow-based MAC learning is particularly problematic in a stacking system like system 100 of FIG. 1A, where a master CPU residing on the system's master device (e.g., master device 102(1)) must generally transmit internal packets to other remote devices in the system in order to install MAC address entries to the hardware MAC tables of those remote devices. These internal packets may be lost, or may be queued for an extended period of time at the remote devices if the CPUs of those devices are busy. During this period, all packets having the yet-to-be-installed MAC address as a destination address will continue to be trapped to the master CPU for processing, thereby further increasing the CPU load of the system.

SUMMARY

Techniques for virtualizing hardware hash tables in a networking system are provided. In one embodiment, the networking system can maintain a plurality of virtual hash tables corresponding to a plurality of hardware hash tables in the networking system. For each hardware hash table and its corresponding virtual hash table, the networking system can intercept operations directed to the hardware hash table and apply the intercepted operations to the virtual hash table. The networking system can then selectively install and/or uninstall virtual hash table entries to/from the hardware hash table in view of the operations.

The following detailed description and accompanying drawings provide a better understanding of the nature and advantages of particular embodiments.

DETAILED DESCRIPTION

Figure 1A:
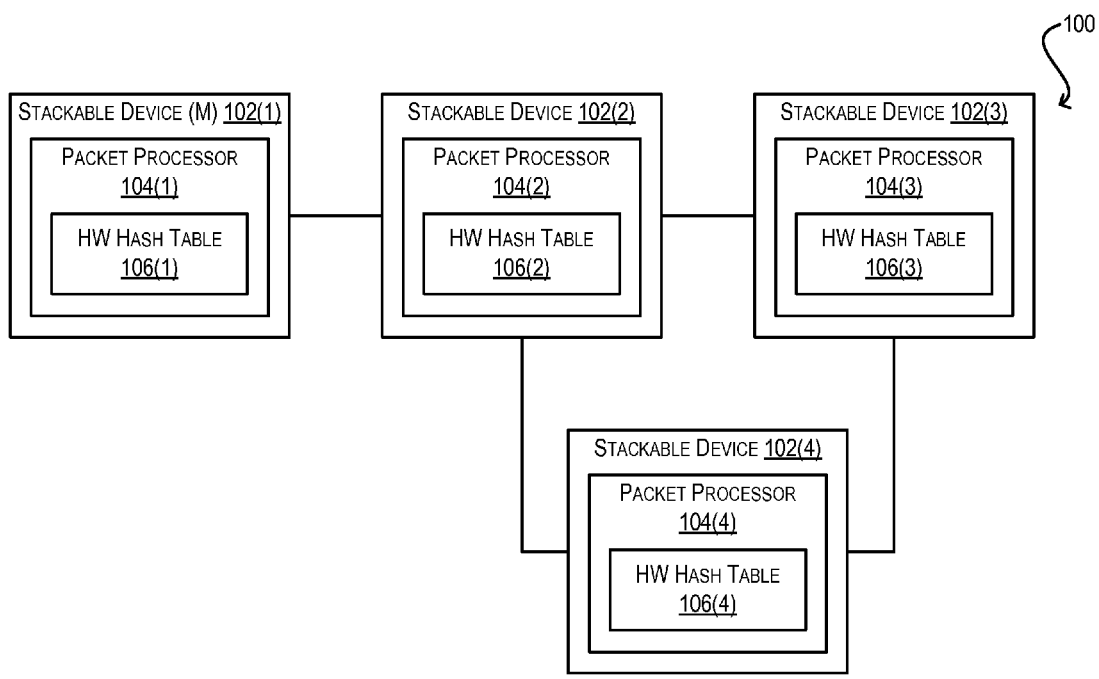
FIG. 1A depicts a stack-based MPP networking system (i.e., stacking system).

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques for virtualizing hardware hash tables in a multi-packet processor (MPP) networking system. At a high level, the MPP networking system can maintain a virtual hash table for each hardware hash table used by a packet processor of the system. The virtual hash tables can be designed to closely mimic the structure of the hardware hash tables. For example, in one embodiment, the virtual hash tables can incorporate the same fields as the hardware hash tables, along with one or more optional fields. However, the sizes of the virtual hash tables and hardware hash tables (in terms of number of entries) can differ; in particular, each virtual hash table can have a uniform size that is larger than the system's smallest hardware hash table size. For instance, if the smallest hardware hash table size is J entries, the uniform virtual hash table size can be 2×J entries, 3×J entries, or some other multiple thereof. The MPP networking system can present this uniform virtual hash table size to the applications running on the system as reflecting the system's actual hardware hash table sizes.

When a hash table operation (e.g., entry insertion, entry deletion, etc.) is invoked with respect to a particular hardware hash table, the MPP networking system can intercept the operation and apply it to the corresponding virtual hash table. The MPP networking system can then selectively install and/or uninstall one or more virtual hash table entries to/from the hardware hash table in view of the applied operation. For example, in the case of an insertion operation, the MPP networking system can initially insert the entry into the virtual hash table, without inserting the entry into the hardware hash table. Once the entry is in the virtual hash table, the MPP networking system can determine, based on a set of rules, whether (and how) the newly inserted virtual hash table entry should be installed to the hardware hash table.

With the virtualization approach described above, the MPP networking system can realize a number of significant benefits. First, in situations where the actual sizes of the system's hardware hash tables vary, the applications running on the system do not need to implement complex logic for handling the disparate table sizes. Instead, the applications can operate on the assumption that all of the hardware hash tables have the same size (i.e., the uniform virtual hash table size), and the virtual infrastructure of the system can handle the task of tracking which hash table entries can (or cannot) be installed to hardware. Accordingly, this approach can address the "installation inconsistency" problem encountered when attempting to install learned MAC addresses to hardware MAC tables of varying sizes.

Second, by selectively installing/uninstalling virtual hash table entries to/from the hardware hash tables based on various rules, the MPP networking system can more effectively utilize the capacity of each hardware hash table. For example, in one embodiment, the MPP networking system can apply a rule that prevents installation of a virtual hash table entry to a corresponding hardware hash table if the entry is not "needed" by the packet processor using that table (e.g., none of the data ports managed by the packet processor are a member of the entry's associated VLAN). In this way, the system can make room in the hardware hash table for other, more useful entries.

In another embodiment, the MPP networking system can rank virtual hash table entries according to user-defined priorities, and can apply rules that take these priorities into account when moving the entries to/from hardware. For instance, if a hardware hash table is full when a new entry is inserted into its corresponding virtual hash table, the MPP networking system can identify an existing entry in the hardware hash table that has a lower priority than the newly inserted virtual hash table entry. The system can then replace the existing entry with the new entry. This increases the likelihood that "important" entries (e.g., protocol MAC addresses in the case of MAC tables) will be installed to, and stay in, the hardware hash table.

In yet another embodiment, the MPP networking system can apply a rule that, at the time of reclaiming/deleting an entry in a hardware hash table, immediately populates the reclaimed entry with a virtual hash table entry that previously did not fit into hardware. With this rule, the system can ensure that the hardware hash table is utilized to the fullest extent possible at all times.

It should be noted that, although the techniques disclosed herein are particularly useful for MPP networking systems that have hardware MAC tables of varying sizes, the techniques are not limited to such use cases. Rather, these techniques may be generally used to virtualize any set of hardware hash tables in an MPP networking system, regardless of their intended role or purpose (e.g., for Layer 2 switching, Layer 3 routing, etc.), and regardless of their relative sizes.

Further, it should be noted that the techniques disclosed herein are not limited to specific types of MPP networking systems. Sections 2 and 3 below provide details for implementing hardware hash table virtualization in the context of stacking systems and chassis systems respectively. However, one of ordinary skill in the art will appreciate that the same virtualization concepts can be readily applied (with minor modifications) to other types of MPP networking systems, such as cluster-based systems (e.g., virtual cluster switches) and the like.

2. Stacking System Implementation

Figure 2:
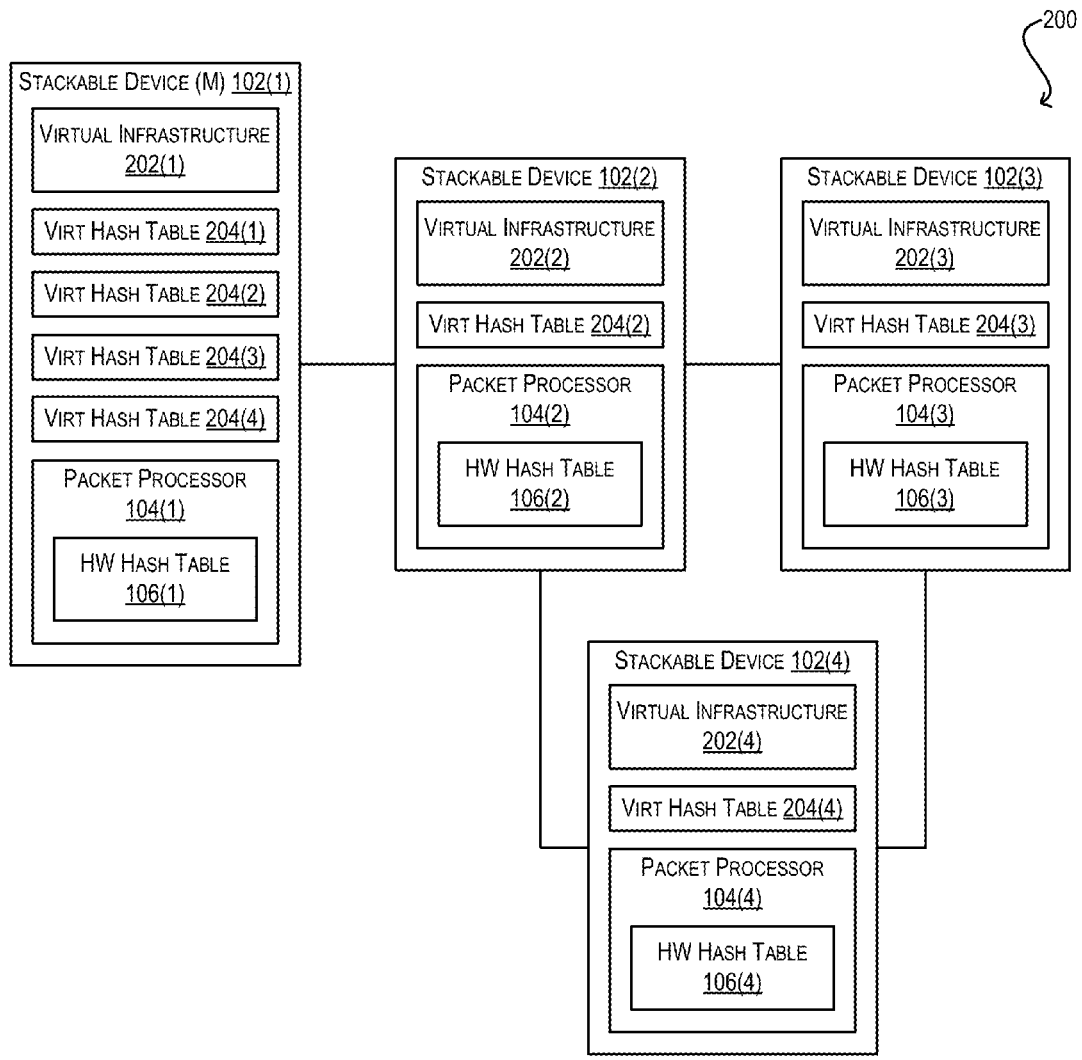
FIG. 2 depicts a stacking system that supports hardware hash table virtualization according to an embodiment.

FIG. 2 depicts a stacking system 200 that supports hardware hash table virtualization according to an embodiment. Like stacking system 100 of FIG. 1A, stacking system 200 comprises stackable devices 102(1)-102(4), each of which includes a packet processor 104(1)-104(4) and an associated hardware hash table 106(1)-106(4). However, for virtualization purposes, system 200 also includes a set of virtual infrastructure (VI) components 202(1)-202(4) and a set of virtual hash tables 204(1)-204(4) corresponding to hardware hash tables 106(1)-106(4).

As shown in FIG. 2, each VI 202(1)-202(4) resides on a respective stackable device of system 200. For instance, the VI can be a software component that runs on a management CPU of that device. On the other hand, each virtual hash table resides in two places: one copy (i.e., the "master copy") resides on master device 102(1), and another copy (i.e., the "non-master copy") resides on a respective non-master device 102(2)-102(4). The one exception to this rule is virtual hash table 204(1), which corresponds to hardware hash table 106(1) of master device 102(1) and thus resides solely on the master device.

As noted the Overview section, virtual hash tables 204(1)-204(4) can be substantially similar in structure to hardware hash tables 106(1)-106(4). For example, virtual hash tables 204(1)-204(4) can share the same fields as hardware hash tables 106(1)-106(4), along with one or more optional fields. In a particular embodiment, the optional fields can include an "install flag" field, a "priority" field, and a "delete flag" field, which are explained below. As another example, virtual hash tables 204(1)-204(4) can use the same hash function(s) as hardware hash tables 106(1)-106(4), such that there is a direct hash bucket correspondence between the virtual and hardware tables.

Figure 3:
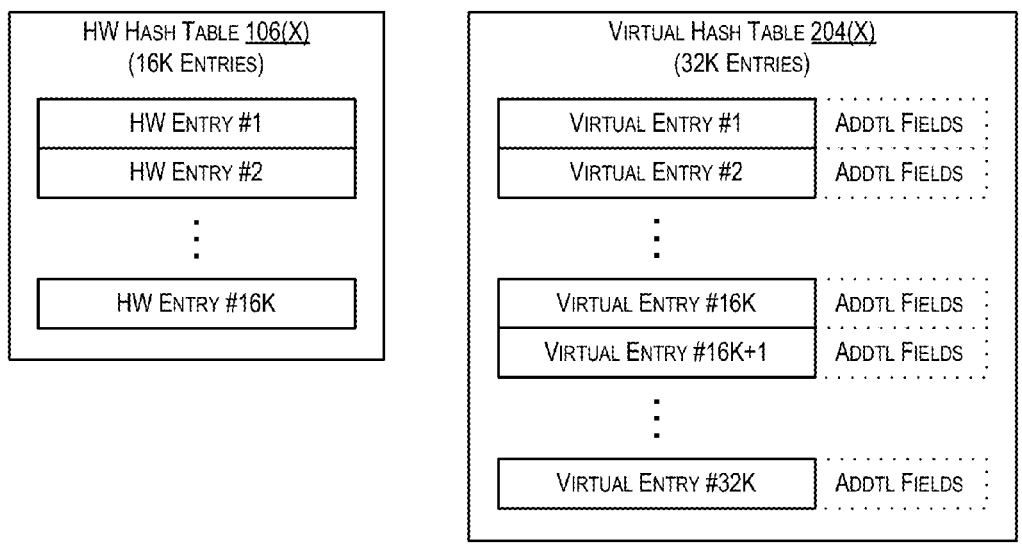
FIG. 3 depicts an exemplary hardware hash table and corresponding virtual hash table according to an embodiment.

However, the sizes of virtual hash tables 204(1)-204(4) and hardware hash tables 106(1)-106(4) can differ; in particular, virtual hash tables 204(1)-204(4) can have a uniform size that is larger than (e.g., is a multiple of) stacking system 200's smallest hardware hash table size. For instance, if the size of each hardware hash table 106(1)-106(4) is 16K entries, the size of each virtual hash table 204(1)-204(4) can be 2×16K=32K entries (see FIG. 3). In this way, virtual hash tables 204(1)-204(4) can be used to store more entries than possible using hardware hash tables 106(1)-106(4).

At runtime of stacking system 200, the uniform size of virtual hash tables 204(1)-204(4) can be made visible to the applications executing on system 200 (via, e.g., a software development kit (SDK)). The applications can perceive this uniform size as reflecting the actual sizes of hardware hash tables 106(1)-106(4). Then, when the applications invoke hash table operations directed to hardware hash tables 106(1)-106(4) (using, e.g., the SDK), VIs 202(1)-202(4) can cooperate to (1) intercept and apply the operations to corresponding virtual hash tables 204(1)-204(4), and (2) selectively install/uninstall virtual hash table entries to/from hardware hash tables 106(1)-106(4), thereby propagating those operations (if needed) to hardware. As part of step (2), VIs 202(1)-202(4) can apply various rules that optimize the utilization of hardware hash tables 106(1)-106(4).

Figure 4:
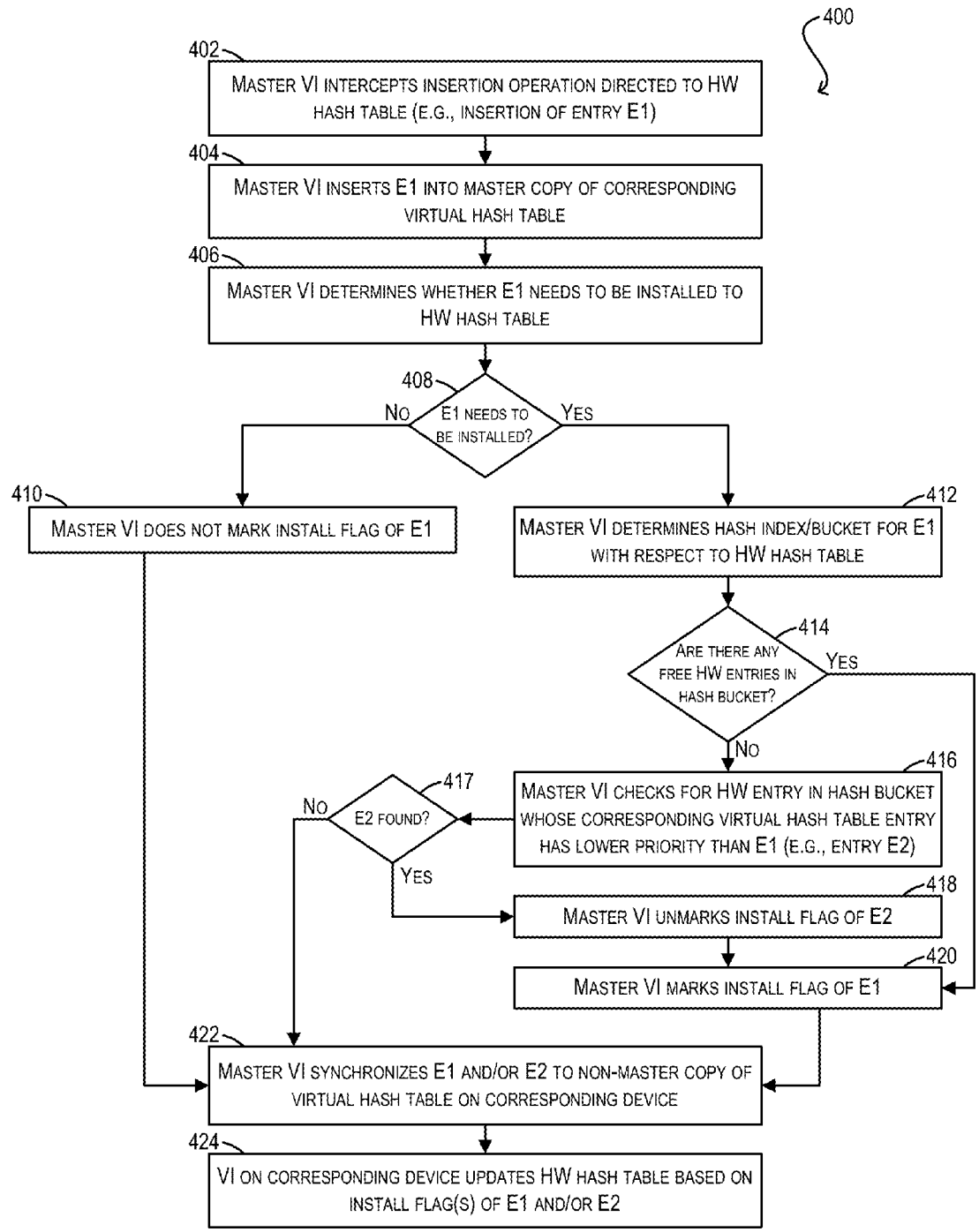
FIG. 4 depicts a flowchart for handling the insertion of a hash table entry in the stacking system of FIG. 2 according to an embodiment.

To clarify the process above, FIG. 4 depicts a flowchart 400 that can be performed by stacking system 200 for handling an entry insertion operation directed to a particular hardware hash table 106(X) according to an embodiment. Flowchart 400 assumes that hardware hash table 106(X) resides on a non-master device 102(X).

At blocks 402 and 404, virtual infrastructure component 202(1) of master device 102(1) (referred to herein as the "master VI") can intercept the insertion operation and can insert a new hash table entry (i.e., entry E1) into the master copy of virtual hash table 204(X) on master device 102(1). As discussed above, entry E1 in virtual hash table 204(X) can include the same fields that would be written to hardware hash table 106(X), but can also include an install flag field, a priority field, and a delete flag field. The install flag field can indicate whether the entry should be installed to hardware, the priority field can contain a user-defined value that identifies the priority of the entry relative to other virtual hash table entries, and the delete flag field can indicate whether the entry should be deleted from the virtual hash table.

At block 406, master VI 202(1) can apply a rule to determine whether entry E1 needs to be installed to hardware hash table 106(X) at this time. Generally speaking, the nature of this rule will depend on the role/purpose of hardware hash table 106(X). For example, if hardware hash table 106(X) is a hardware MAC table, master VI 202(1) can check whether a VLAN identifier included in entry E1 is associated with any of the data ports of packet processor 104(X). If hardware hash table 106(X) is used for a different purpose (e.g., as a Layer 3 routing table), master VI 202(1) can perform a different check at this step, or omit it entirely.

If master VI 202(1) determines that entry E1 does not need to installed to hardware (e.g., the VLAN ID of entry E1 is not associated with any data ports of packet processor 104(X)) (block 408), master VI 202(1) can proceed down the left-hand path of flowchart 400 and can leave the install flag for E1 unmarked in the master copy of virtual hash table 204(X) (block 410).

On the other hand, if master VI 202(1) determines that entry E1 does need to installed to hardware (block 408), master VI 202(1) can proceed down the right-hand path starting at block 412. In particular, master VI 202(1) can first determine a hash bucket for entry E1 with respect to hardware hash table 106(X) (block 412). In embodiments where virtual hash table 204(X) and hardware hash table 106(X) use the same hash function, this can comprise retrieving E1's virtual hash bucket, since the same hash bucket will apply to hardware hash table 106(X). In embodiments where virtual hash table 204(X) and hardware hash table 106(X) use different hash functions, this can comprise executing the hardware hash function on entry E1 (or, if the hardware hash bucket value is stored as an optional field in virtual hash table 204(X), retrieving the bucket value from that field).

Once the hardware hash bucket is determined, master VI 202(1) can check whether there are any free entries in hardware hash table 106(X) for the hardware hash bucket (block 414). If there are no free entries, master VI 202(1) can check for a hardware entry in the hash bucket whose corresponding virtual hash table entry in virtual hash table 204(X) has a lower priority than the priority for entry E1 (i.e., entry E2) (block 416). If such an entry E2 is found (block 417), master VI 202(1) can unmark the install flag for entry E2 (block 418) and can mark the install flag for entry E1 in the master copy of virtual hash table 204(X) (block 420). In this manner, master VI 202(1) can effectively "kick out" entry E2 in hardware hash table 106(X) to make room for new entry E1.

On the other hand, if master VI 202(1) determines that no entry E2 can be found at block 417, master VI 202(1) can skip blocks 418 and 420 entirely, thereby preventing E1 from being installed to hardware hash table 106(X).

Alternatively, if master VI 202(1) determines that there are free entries in the hardware hash bucket at block 414, master VI 202(1) can directly mark the install flag for E1 (block 420).

At the conclusion of either block 420, block 410, or block 417, master VI 202(1) can synchronize the virtual hash table entries affected by its prior processing (e.g., entries E1 and/or E2) from the master copy of virtual hash table 204(X) on master device 102(1) to the non-master copy on device 102(X) (block 422). Finally, at block 424, VI 202(X) on device 102(X) can update hardware hash table 106(X) in accordance with the install flags of entries E1 and/or E2 in the non-master copy of virtual hash table 204(X). For example, if the install flag is marked, VI 202(X) can install the entry to hardware hash table 106(X), and if the install flag is not marked, VI 202(X) can refrain from installing the entry to hardware hash table 106(X) (or uninstall the entry if it is already in table 106(X)).

Figure 5:
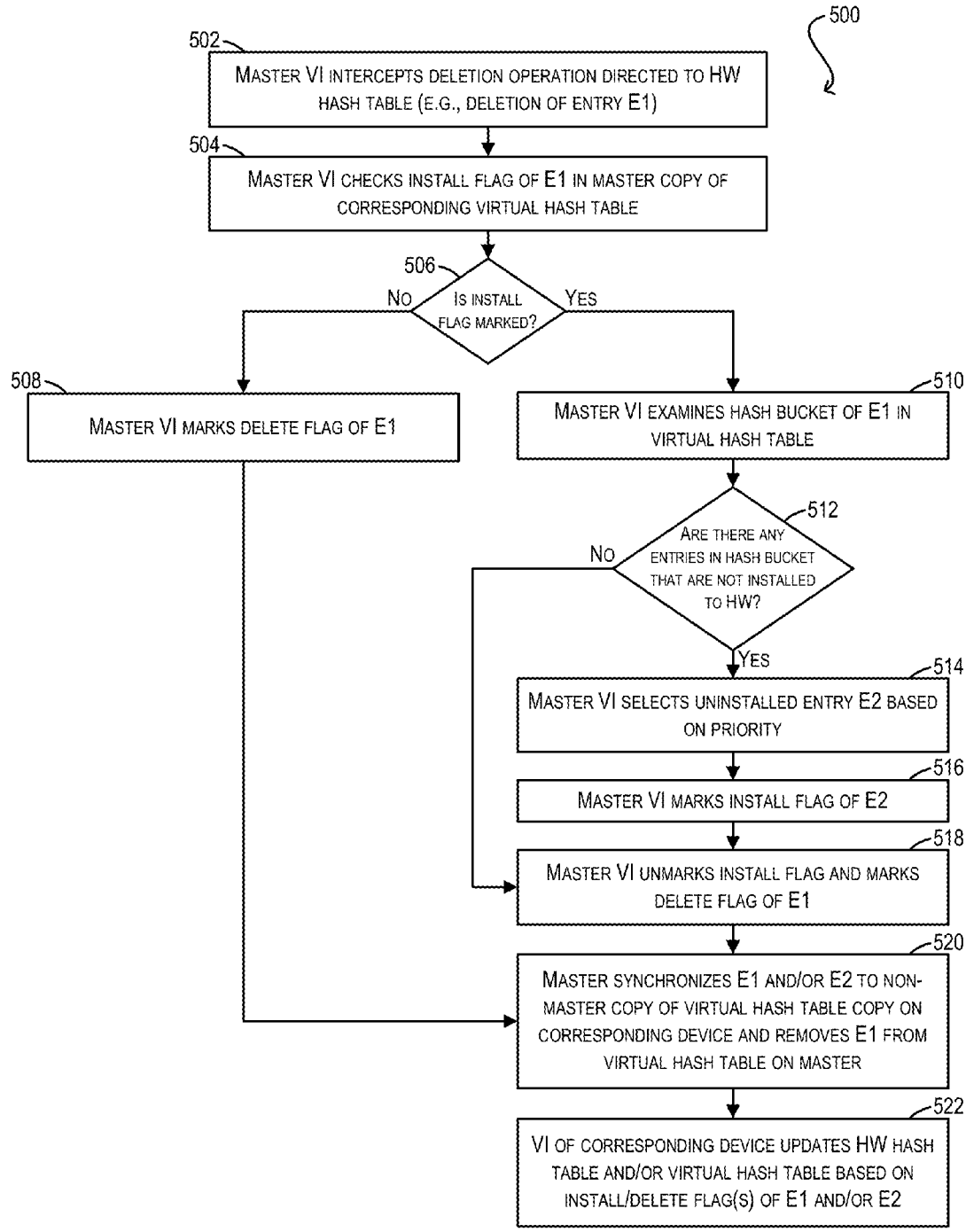
FIG. 5 depicts a flowchart for handling the deletion of a hash table entry in the stacking system of FIG. 2 according to an embodiment.

FIG. 5 depicts a flowchart 500 that can be performed by stacking system 200 for handling an entry deletion operation directed to a hardware hash table 106(X) according to an embodiment. This scenario may occur, e.g., if the entry has been aged out of hardware. Like flowchart 400, flowchart 500 assumes that hardware hash table 106(X) resides on a non-master device 102(X).

At blocks 502 and 504, master VI 202(1) can intercept the deletion operation and can check, in the master copy of virtual hash table 204(X), the install flag for the entry to be deleted (i.e., entry E1). If master VI 202(1) determines that the install flag for E1 is unmarked (indicating that the entry is not currently installed to hardware hash table 106(X)) (block 506), master VI 202(1) can mark the delete flag for E1, thereby indicating that the entry should be removed from the virtual hash table. Master VI 202(1) can then synchronize entry E1 from the master copy of virtual hash table 204(X) on master device 102(1) to the non-master copy of virtual hash table 204(X) on device 102(X), and can remove E1 from the master copy (block 520). Upon receiving the synchronized entry, VI 202(X) on device 102(X) can likewise delete E1 from the non-master copy of virtual hash table 204(X) based on the marked delete flag (block 522).

On the other hand, if master VI 202(1) determines at block 506 that the install flag for E1 is marked, master VI 202(1) can examine the hash bucket for E1 in the master copy of virtual hash table 204(X) (block 510). If there are any entries in the hash bucket that are not installed to hardware hash table 106(X), master VI 202(1) can select one of the uninstalled entries (i.e., entry E2) to replace E1 in the hardware table (blocks 512 and 514). In one embodiment, the selection at block 514 can be based on the entries' relative priorities. Master VI 202(1) can then mark the install flag for E2, unmark the install flag for E1, and mark the delete flag for E1 (blocks 516 and 518).

Alternatively, if master VI 202(1) determines at block 512 that there are no uninstalled entries in the same hash bucket as E1, master VI 202(1) can directly mark the uninstall flag and mark the delete flag for entry E1 (block 518).

Once master VI 202(1) has marked and/or unmarked the install/delete flags of E1 and E2 per blocks 510-518, master VI 202(1) can synchronize the virtual hash table entries affected by its prior processing (e.g., entries E1 and/or E2) from the master copy of virtual hash table 204(X) on master device 102(1) to the non-master copy on device 102(X) (block 520). In addition, master VI 202(1) can remove E1 from the master copy of virtual hash table 204(X). Finally, at block 522, VI 202(X) on device 102(X) can update hardware hash table 106(X) in accordance with the install flags of entries E1 and/or E2, as well as update the non-master copy of virtual hash table 204(X) in accordance with the delete flag of entry E1.

It should be appreciated that flowcharts 400 and 500 of FIGS. 4 and 5 are illustrative and various modifications are possible. For example, flowcharts 400 and 500 reflect a "centralized" approach for handling hash table operations, where the master VI of the system (i.e., master VI 202(1)) is responsible for determining which virtual hash table entries should be installed to/uninstalled from hardware and marking/unmarking the install/delete flags of those entries appropriately in the master copy of virtual hash table 204(X). Master VI 202(1) then syncs the master copy to the non-master copy on non-master device 102(X), and VI 202(X) of non-master device 102(X) subsequently propagates those changes to the hardware table.

In alternative embodiments, flowcharts 400 and 500 can be implemented using a "distributed" approach where master VI 202(1) applies the intercepted operation to the master copy of virtual hash table 204(X) and immediately syncs the master copy to the non-master copy on non-master device 102(X). VI 202(X) of non-master device 102(X) can then perform the steps attributed to master VI 202(X) for determining which virtual hash table entries should be installed to, or uninstalled from, hardware (i.e., blocks 406-420 in FIG. 4, blocks 510-518 in FIG. 5). This distributed approach has the advantage of reducing the CPU load on master device 102(1) (but may prevent the master device from knowing which entries actually have, or have not, been installed).

Further, although flowcharts 400 and 500 depict a specific sequence of rules for processing insertion and deletion operations (e.g., checking whether an inserted entry is needed by the packet processor using the hardware table, kicking out lower priority entries, etc.), different rules may be applied in different embodiments. For example, these rules may vary based on how the hardware hash tables are used (e.g., as MAC tables, IP tables, etc.). One of ordinary skill in the art will recognize many variations, modifications, and alternatives.

3. Chassis System Implementation

Figure 1B:
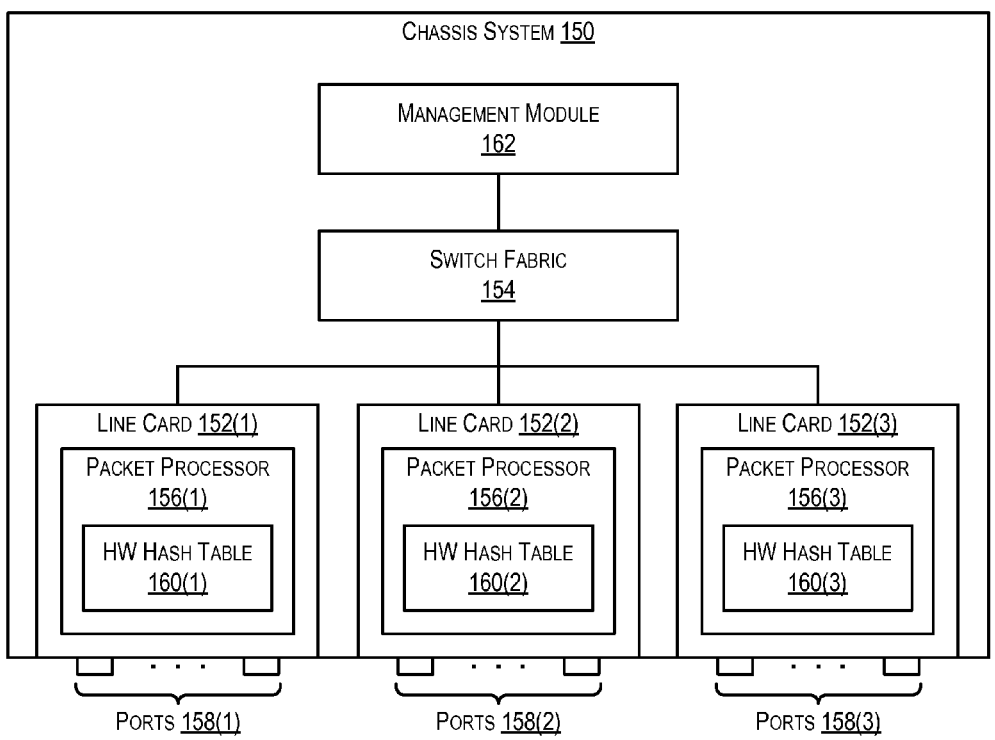
FIG. 1B depicts a chassis-based MPP networking system (i.e., chassis system).
Figure 6:
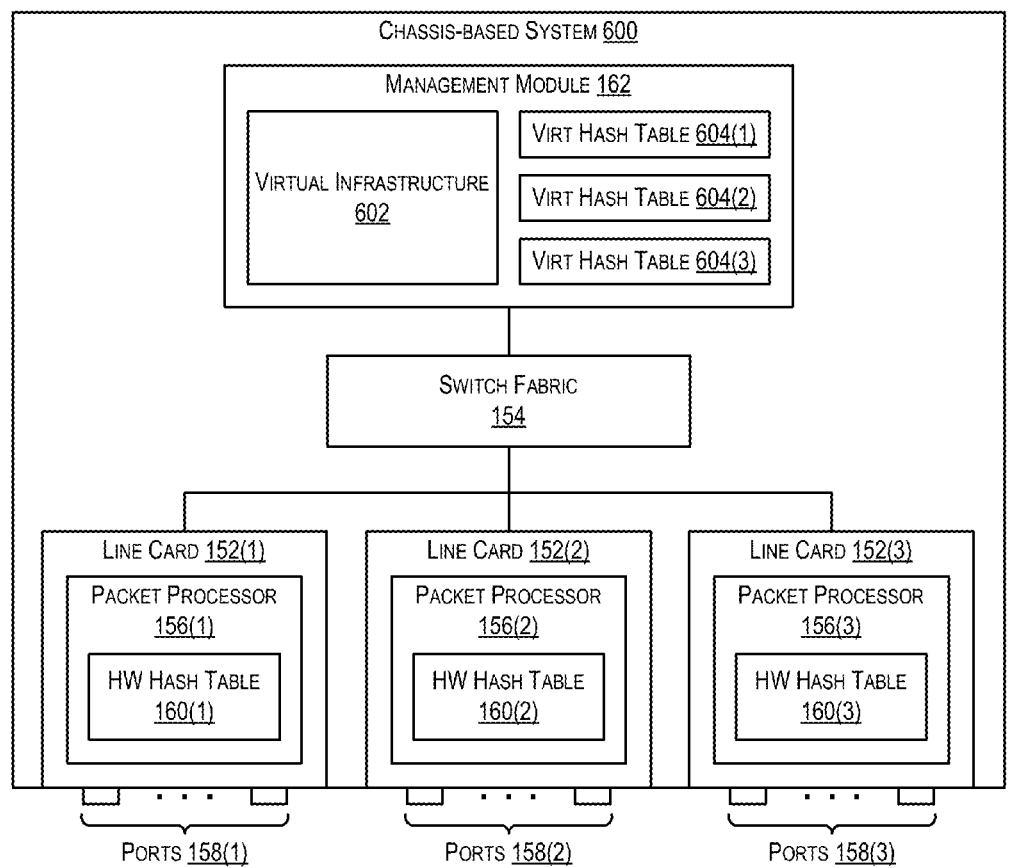
FIG. 6 depicts a chassis system that supports hardware hash table virtualization according to an embodiment.

As noted previously, embodiments of the present invention may be applied to various types of MPP networking systems other than the stacking system shown in FIG. 2. By way of example, FIG. 6 depicts a chassis system 600 that supports hardware hash table virtualization according to an embodiment. Like chassis system 150 of FIG. 1B, chassis system 600 comprises a management module 162 and a number of line cards 152(1)-152(3) interconnected via a switch fabric 154. Each line card 152(1)-152(3) includes a packet processor 156(1)-156(3) and an associated hardware hash table 160(1)-160(3). For purposes of this example, it is assumed that the management CPU of management module 162 can directly program packet processors 156(1)-156(3).

For virtualization purposes, chassis system 600 also includes, within management module 162, a VI component 602 and a set of virtual hash tables 604(1)-604(3) corresponding to hardware hash tables 160(1)-160(3). Generally speaking, VI 602 and virtual hash tables 604(1)-604(3) can be functionality similar to VIs 202(1)-204(4) and virtual hash tables 204(1)-204(4) of stacking system 200. For example, VI 602 can be a software component that runs on a management CPU of chassis system 600 (e.g., the management CPU of management module 162), and virtual hash tables 204(1)-204(4) can be software-based hash tables that reside in an associated RAM. However, since, chassis system 600 is an integrated unit, there is no need for multiple instances of the VI component on different devices, or for synchronizing changes between master and non-master copies of the virtual hash tables. Instead, VI 602 can be responsible for intercepting and applying hardware hash table operations to virtual hash tables 604(1)-604(3), determining which virtual hash table entries should be installed to/uninstalled from hardware hash tables 160(1)-160(3) (per the logic shown in FIGS. 4 and 5), and then directly propagating those changes to hardware.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
    maintaining, by a networking system, a plurality of virtual hash tables corresponding to a plurality of hardware hash tables in the networking system; and
    for each hardware hash table and its corresponding virtual hash table:
        intercepting, by the networking system, operations directed to the hardware hash table;
        applying, by the networking system, the intercepted operations to the virtual hash table; and
        selectively installing, by the networking system, entries in the virtual hash table to the hardware hash table.

2. The method of claim 1 wherein the plurality of hardware hash tables have varying sizes.

3. The method of claim 1 wherein each virtual hash table in the plurality of virtual hash tables is larger in size than the smallest hardware hash table in the plurality of hardware hash tables.

4. The method of claim 1 wherein the plurality of virtual hash tables are virtual MAC tables and wherein the plurality of hardware hash tables are hardware MAC tables.

5. The method of claim 1 wherein the networking system comprises a plurality of packet processors, and wherein each hardware hash table in the plurality of hardware hash tables is associated with a packet processor in the plurality of packet processors.

6. The method of claim 5 wherein selectively installing entries in the virtual hash table to the hardware hash table comprises, for a first virtual hash table entry:
    determining whether a VLAN identifier included in the first virtual hash table entry is associated with a data port managed by the hardware hash table's associated packet processor.

7. The method of claim 6 wherein the selectively installing further comprises, if the VLAN identifier is associated with a data port managed by the hardware hash table's associated packet processor:
    computing a hash index by hashing one or more fields of the first virtual hash table entry;
    determining a set of hardware hash table entries in the hardware hash table corresponding to the hash index; and
    if there is an unoccupied entry in set of hardware hash table entries, installing the first virtual hash table entry to the unoccupied entry.

8. The method of claim 7 wherein the selectively installing further comprises, if all entries in the set of hardware hash table entries are already occupied with virtual hash table entries in the virtual hash table:
    checking for an occupied entry in the set of hardware hash table entries that has a corresponding virtual hash table entry with a lower priority than the first virtual hash table entry; and
    if such an occupied entry is found:
        clearing the occupied entry; and
        installing the first virtual hash table entry to the cleared entry.

9. The method of claim 1 further comprising, for each virtual hash table and its corresponding hardware hash table:
    selectively uninstalling entries in the virtual hash table from the hardware hash table.

10. The method of claim 9 wherein selectively uninstalling entries in the virtual hash table from the hardware hash table comprises, for a first virtual hash table entry:
    identifying an entry in the hardware hash table occupied with the first virtual hash table entry; and
    clearing the entry.

11. The method of claim 10 wherein the selectively uninstalling further comprises:
    identifying a second virtual hash table entry that is in the same hash bucket as the first virtual hash table entry and that is not installed in the hardware hash table; and
    installing the second virtual hash table entry to the cleared entry.

12. The method of claim 1 wherein the networking system is a stacking system comprising a plurality of stackable devices, and wherein each hardware hash table in the plurality of hardware hash tables is resident on a different stackable device in the plurality of stackable devices.

13. The method of claim 12 wherein the intercepting and the applying are performed by a master device in the plurality of stackable devices.

14. The method of claim 1 wherein the networking system is a chassis-based system comprising a plurality of line cards, and wherein each hardware hash table in the plurality of hardware hash tables is resident on a different line card in the plurality of line cards.

15. A non-transitory computer readable medium having stored thereon program code executable by one or more processors of a networking system, the program code comprising:
- code that causes the one or more processors to maintain a plurality of virtual hash tables corresponding to a plurality of hardware hash tables in the networking system; and
- for each hardware hash table and its corresponding virtual hash table:
  - code that causes the one or more processors to intercept operations directed to the hardware hash table;
  - code that causes the one or more processors to apply the intercepted operations to the virtual hash table; and
  - code that causes the one or more processors to selectively install entries in the virtual hash table to the hardware hash table.

16. The non-transitory computer readable medium of claim 15 wherein the plurality of hardware hash tables have varying sizes.

17. The non-transitory computer readable medium of claim 15 wherein each virtual hash table in the plurality of virtual hash tables is larger in size than the smallest hardware hash table in the plurality of hardware hash tables.

18. A networking system comprising:
- one or more processors;
- a plurality of hardware hash tables; and
- a non-transitory computer readable medium having stored thereon program code which, when executed by the one or more processors, causes the one or more processors to:
- maintain a plurality of virtual hash tables corresponding to the plurality of hardware hash tables; and
- for each hardware hash table and its corresponding virtual hash table:
  - intercept operations directed to the hardware hash table;
  - apply the intercepted operations to the virtual hash table; and
  - selectively install entries in the virtual hash table to the hardware hash table.

19. The networking system of claim 18 wherein the plurality of hardware hash tables have varying sizes.

20. The networking system of claim 18 wherein each virtual hash table in the plurality of virtual hash tables is larger in size than the smallest hardware hash table in the plurality of hardware hash tables.

\* \* \* \* \*